US012587283B2

(12) United States Patent
    Igarashi et al.

(10) Patent No.: US 12,587,283 B2
(45) Date of Patent: Mar. 24, 2026

(54) RECEIVING APPARATUS AND RECEIVING METHOD

(71) Applicant: NTT, Inc., Tokyo (JP)

(72) Inventors: Ryo Igarashi, Musashino (JP); Ryo Koma, Musashino (JP)

(73) Assignee: NTT, Inc., Tokyo (JP)

( * ) Notice: Subject to any disclaimer, the term of this patent is extended or adjusted under 35 U.S.C. 154(b) by 264 days.

(21) Appl. No.: 18/037,519

(22) PCT Filed: Nov. 25, 2020

(86) PCT No.: PCT/JP2020/043819
    § 371 (c)(1),
    (2) Date: May 17, 2023

(87) PCT Pub. No.: WO2022/113205
    PCT Pub. Date: Jun. 2, 2022

(65) Prior Publication Data
    US 2023/0403080 A1     Dec. 14, 2023

(51) Int. Cl.
    *H04B 10/61*        (2013.01)
    *H04B 10/077*       (2013.01)
    *H04L 27/00*        (2006.01)

(52) U.S. Cl.
    CPC ........... *H04B 10/61* (2013.01); *H04B 10/077* (2013.01); *H04B 10/6165* (2013.01); *H04L 27/0014* (2013.01); *H04L 2027/0026* (2013.01)

(58) Field of Classification Search
    CPC ... H04B 10/077; H04B 10/61; H04B 10/6165
    (Continued)

(56) References Cited

U.S. PATENT DOCUMENTS

2009/0080906 A1\*   3/2009   Tao ........................ H04B 10/61
                                                    398/209
2010/0189445 A1\*   7/2010   Nakashima ............ H04B 10/65
                                                    398/152

(Continued)

FOREIGN PATENT DOCUMENTS

JP        2016034078 A        3/2016
JP        2017022509 A        1/2017
JP        2020039089 A        3/2020

OTHER PUBLICATIONS

Naoki Suzuki et al., Demonstration of 100-Gb/s/λ-Based Coherent WDM-PON System Using New AGC EDFA Based Upstream Preamplifier and Optically Superimposed AMCC Function., Journal of Lightwave Technology, vol. 35, No. 8, Apr. 15, 2017.

*Primary Examiner* — Li Liu
(74) *Attorney, Agent, or Firm* — Harness, Dickey & Pierce, P.L.C.

(57)                ABSTRACT

One aspect of the present invention is a receiving apparatus including a reception unit that receives signal light frequency-modulated by a signal obtained by adding a main signal and a control signal having a lower frequency than the main signal, and converts the signal light into an analog electric signal, and a processing unit that acquires a code sequence corresponding to the control signal on the basis of the analog electric signal, in which the processing unit includes a frequency offset amount acquisition unit that acquires a frequency offset amount of the signal light acquired on the basis of the analog electric signal, and a determination unit that determines the code sequence corresponding to the control signal on the basis of the frequency offset amount acquired by the frequency offset amount acquisition unit.

6 Claims, 13 Drawing Sheets

(58) Field of Classification Search
USPC ................................................... 398/202, 208
See application file for complete search history.

(56) References Cited

U.S. PATENT DOCUMENTS

| | | | |
|---|---|---|---|
| 2015/0341138 A1* | 11/2015 | Ishihara ..................... | H04J 3/14 |
| | | | 398/35 |
| 2016/0036533 A1* | 2/2016 | Nakashima ...... | H04B 10/50575 |
| | | | 398/187 |
| 2017/0012803 A1* | 1/2017 | Sasaki ................ | H04B 10/6162 |
| 2021/0399809 A1* | 12/2021 | Igarashi ................. | H04L 27/20 |
| 2023/0208542 A1* | 6/2023 | Krampl ................ | H04J 3/0605 |
| | | | 398/43 |

* cited by examiner (A) (1) MODULATION SIGNAL OF MAIN SIGNAL (B) (2) MODULATION SIGNAL OF AMCC SIGNAL (C) (1)+(2)+DC BIAS

START

S1-1

GENERATE MAIN SIGNAL

S2-1

GENERATE AMCC SIGNAL

S3-1

GENERATE MODULATION SIGNAL

S4-1

TRANSMIT SIGNAL LIGHT

END

START

S1-2

GENERATE LOCAL OSCILLATION LIGHT

S2-2

RECEIVE OPTICAL SIGNAL

S3-2

ANALOG-DIGITAL CONVERSION

S4-2

DIGITAL SIGNAL PROCESSING

END

1

RECEIVING APPARATUS AND RECEIVING METHOD

CROSS-REFERENCE TO RELATED APPLICATIONS

This application is a 371 U.S. National Phase of International Application No. PCT/JP2020/043819, filed on Nov. 25, 2020. The entire disclosure of the above application is incorporated herein by reference.

TECHNICAL FIELD

The present invention relates to a technology of a receiving apparatus and a receiving method.

BACKGROUND ART

A technology of applying an auxiliary management and control channel (AMCC) scheme to a digital coherent transmission scheme is known (see Non Patent Literature 1, for example).

In general, many digital coherent transmission schemes require an IQ modulator in the transmitter, which increases cost. Therefore, a continuous phase frequency shift keying (CPFSK) scheme has been proposed as a method for reducing the cost of the transmitter. In the CPFSK scheme, the transmitter has a direct modulation configuration, and the amplitude of the modulation signal is set to be smaller than that at the time of normal intensity modulation, so that the signal light is frequency-modulated with a constant amplitude. The reception side performs communication by calculating a phase change amount occurring within a certain period of time. In this scheme, since an IQ modulator is not required for the transmitter, cost reduction of the transmitter can be expected.

CITATION LIST

Non Patent Literature

Non Patent Literature 1: N. Suzuki et al., "Demonstration of 100-Gb/s/λ-Based Coherent WDM-PON System Using New AGC EDFA Based Upstream Preamplifier and Optically Superimposed AMCC Function," IEEE Journal of Lightwave Technology, vol. 35, No. 8, Apr. 15, 2017.

SUMMARY OF INVENTION

Technical Problem

However, in a case where the AMCC scheme is applied to the CPFSK scheme which is one of the digital coherent transmission schemes, when the main signal and the AMCC signal are separated at the optical stage, there is a problem that the device configuration of the receiver becomes complicated.

In view of the above circumstances, an object of the present invention is to provide a technology that can simplify the configuration of a receiving apparatus in a case where an AMCC scheme is applied in a CPFSK scheme which is one of digital coherent transmission schemes.

Solution to Problem

One aspect of the present invention is a receiving apparatus including a reception unit (hereinafter also referred to as "receiver") that receives signal light frequency-modulated by a signal obtained by adding a main signal and a control signal having a lower frequency than the main signal, and converts the signal light into an analog electric signal, and a processing unit (hereinafter also referred to as "processor") that acquires a code sequence corresponding to the control signal on the basis of the analog electric signal, in which the processing unit includes a frequency offset amount acquisition unit that acquires a frequency offset amount of the signal light acquired on the basis of the analog electric signal, and a determination unit that determines the code sequence corresponding to the control signal on the basis of the frequency offset amount acquired by the frequency offset amount acquisition unit.

One aspect of the present invention is a receiving apparatus including a reception unit (hereinafter also referred to as "receiver") that receives signal light frequency-modulated by a signal obtained by adding a main signal and a signal obtained by superimposing a subcarrier on a control signal having a lower frequency than the main signal, and converts the signal light into an analog electric signal, and a processing unit (hereinafter also referred to as "processor") that acquires a code sequence corresponding to the control signal on the basis of the analog electric signal, in which the processing unit includes a frequency offset amount acquisition unit that acquires a frequency offset amount of the signal light acquired on the basis of the analog electric signal, a down-conversion unit that down-converts the frequency offset amount acquired by the frequency offset amount acquisition unit to baseband, and a determination unit that determines the code sequence corresponding to the control signal on the basis of the frequency offset amount down-converted to baseband by the down-conversion unit.

One aspect of the present invention is a receiving method executed by a receiving apparatus, the receiving method including the steps of: receiving signal light frequency-modulated by a signal obtained by adding a main signal and a control signal having a lower frequency than the main signal, and converting the signal light into an analog electric signal; acquiring a frequency offset amount of the signal light acquired on the basis of the analog electric signal; and determining a code sequence corresponding to the control signal on the basis of the frequency offset amount.

One aspect of the present invention is a receiving method executed by a receiving apparatus, the receiving method including the steps of: receiving signal light frequency-modulated by a signal obtained by adding a main signal and a signal obtained by superimposing a subcarrier on a control signal having a lower frequency than the main signal, and converting the signal light into an analog electric signal; acquiring a frequency offset amount of the signal light acquired on the basis of the analog electric signal; down-converting the frequency offset amount to baseband; and determining a code sequence corresponding to the control signal on the basis of the frequency offset amount down-converted to baseband.

Advantageous Effects of Invention

According to the present invention, it is possible to simplify the configuration of a receiving apparatus in a case where an AMCC scheme is applied to a CPFSK scheme which is one of digital coherent transmission schemes.

3

Figure 2:
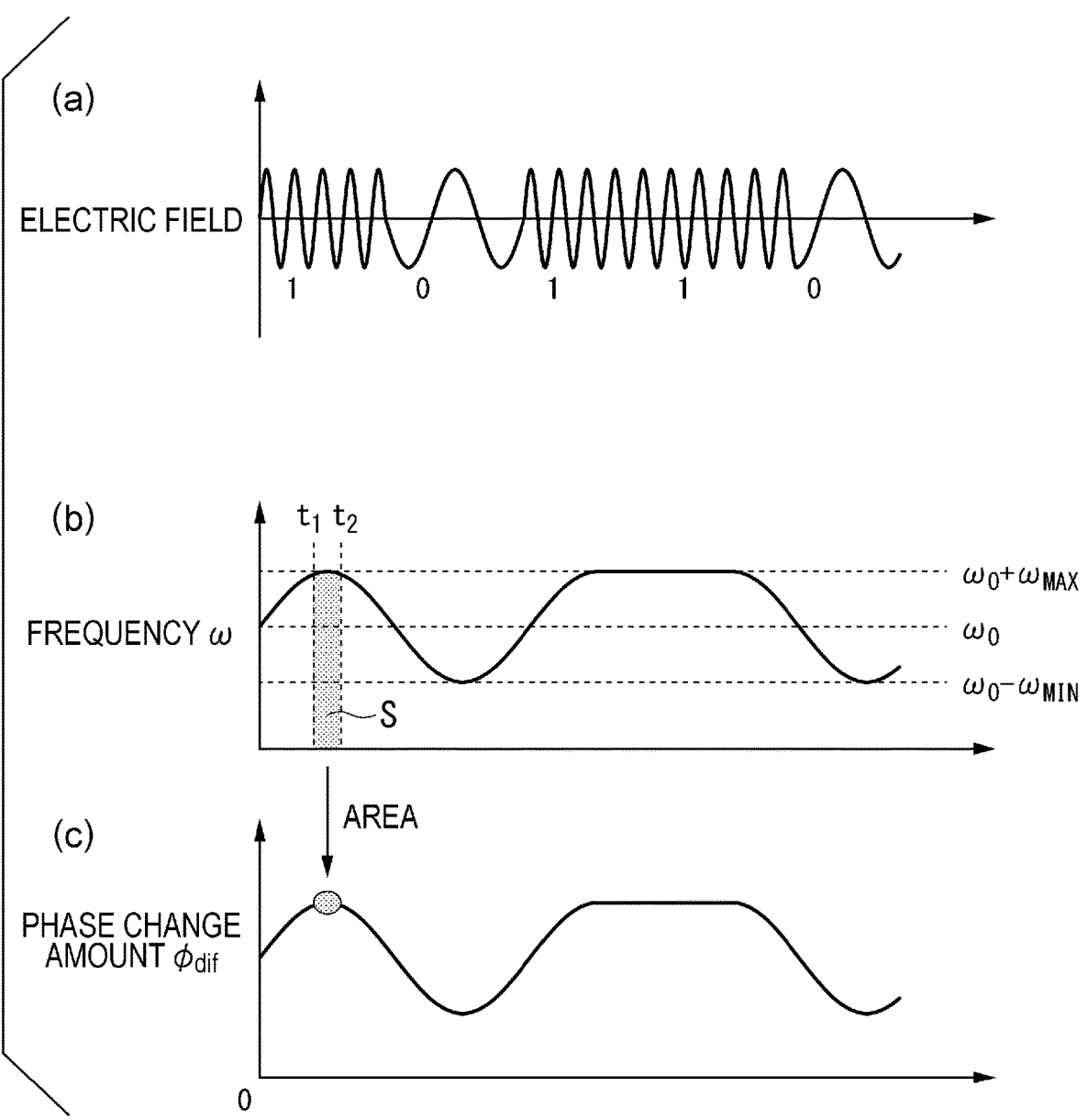

FIG. 2 is a diagram for describing Example 1 of CPFSK modulation.

Figure 3A:
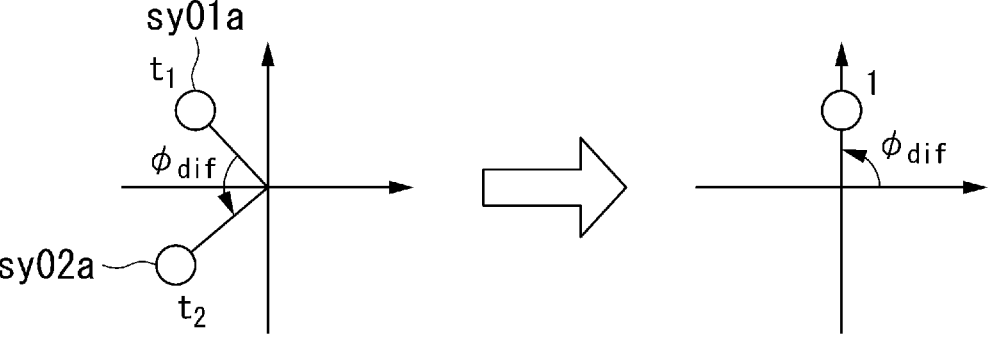

FIG. 3A is a diagram for describing Example 2 of CPFSK modulation.

Figure 3B:
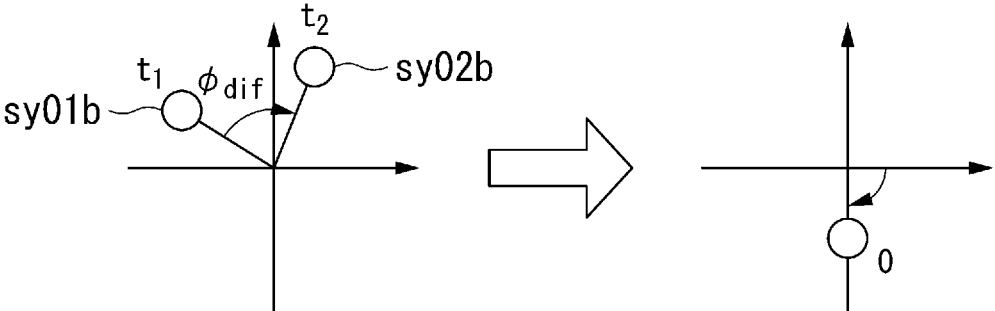

FIG. 3B is a diagram for describing Example 2 of CPFSK modulation.

Figure 4:
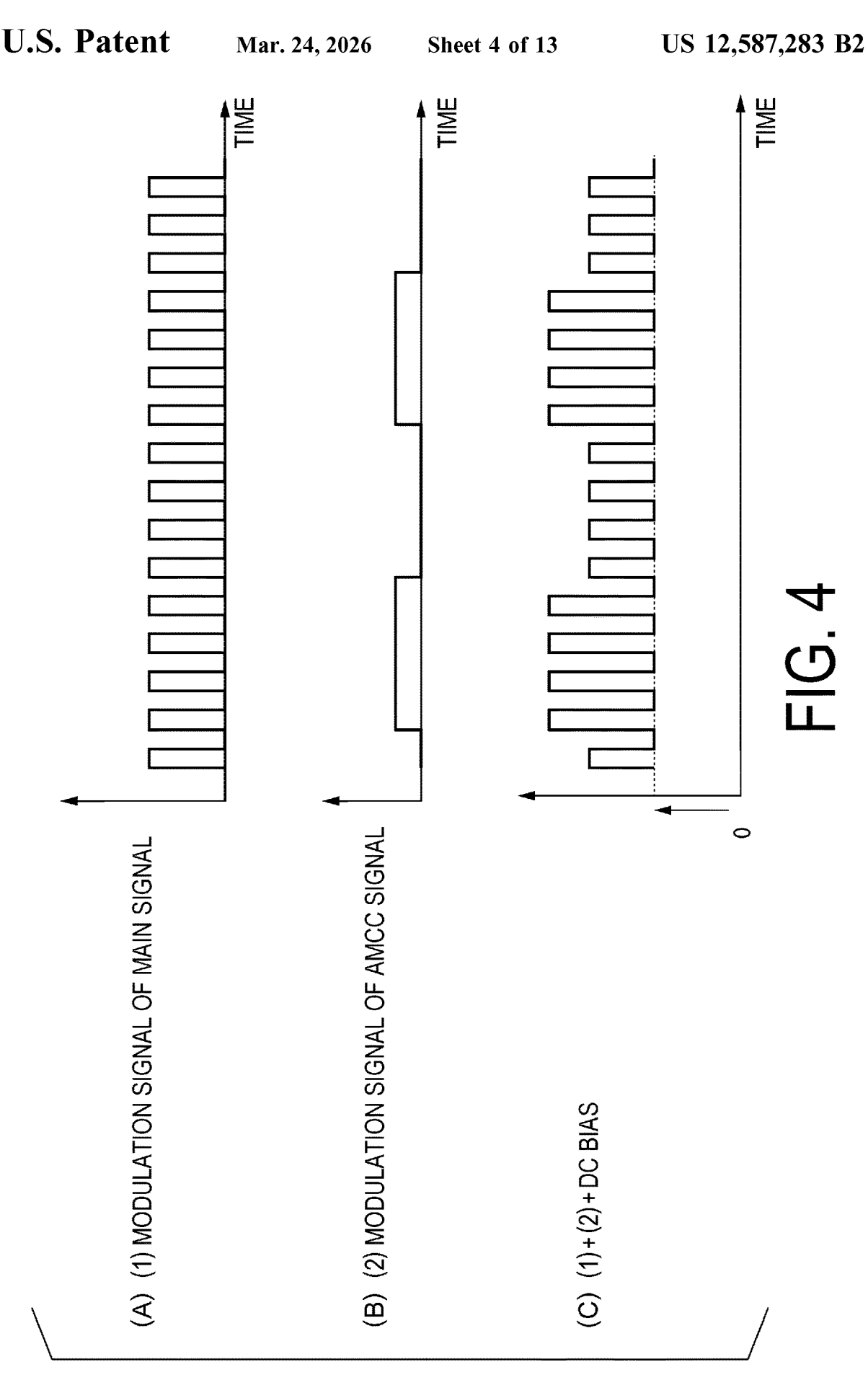

FIG. 4 is a diagram illustrating an example of processing of a transmission device 10 according to the present embodiment.

Figure 5:
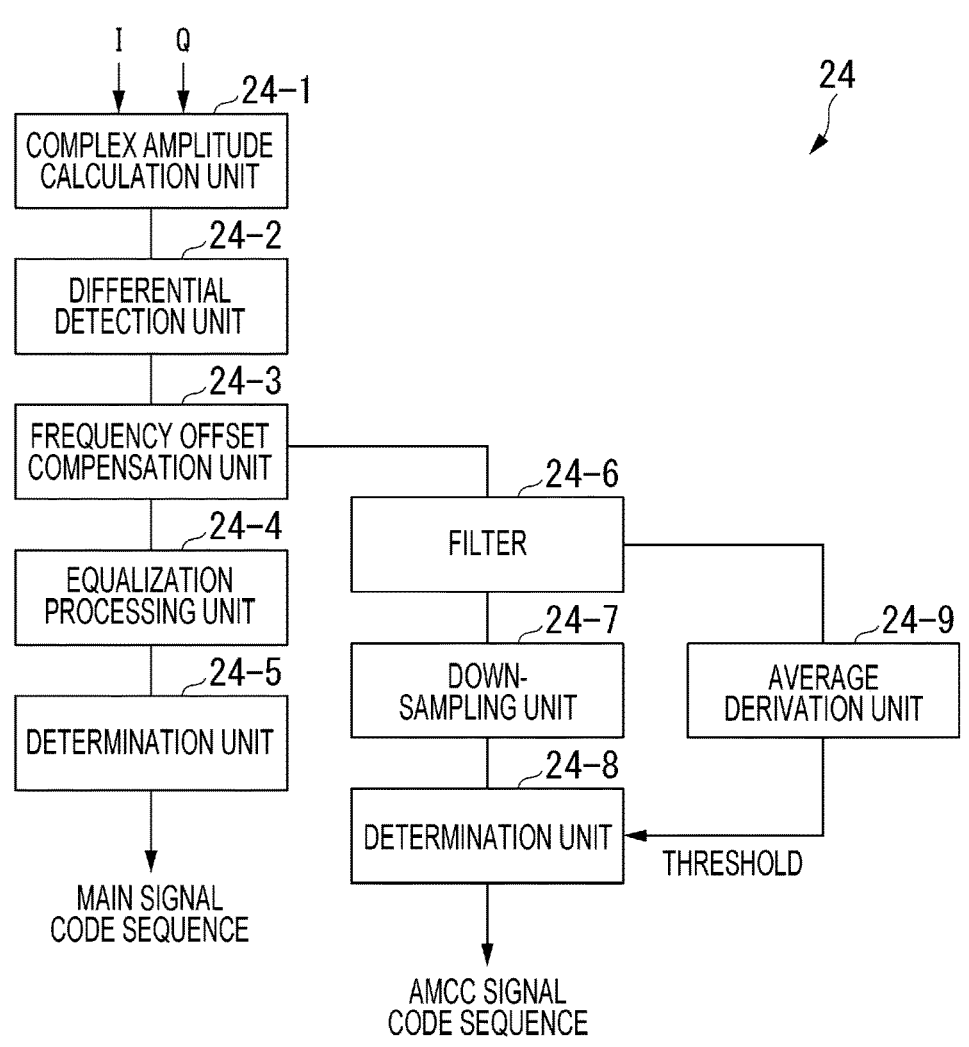

FIG. 5 is a diagram illustrating an example of a receiving apparatus 20 according to the present embodiment.

Figure 6:
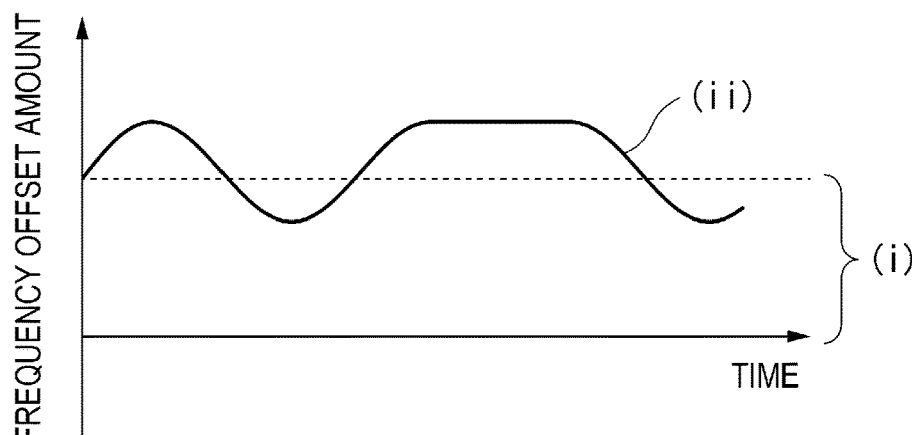

FIG. 6 is a diagram illustrating an example of a time waveform of a frequency offset amount.

Figures 7, 8:
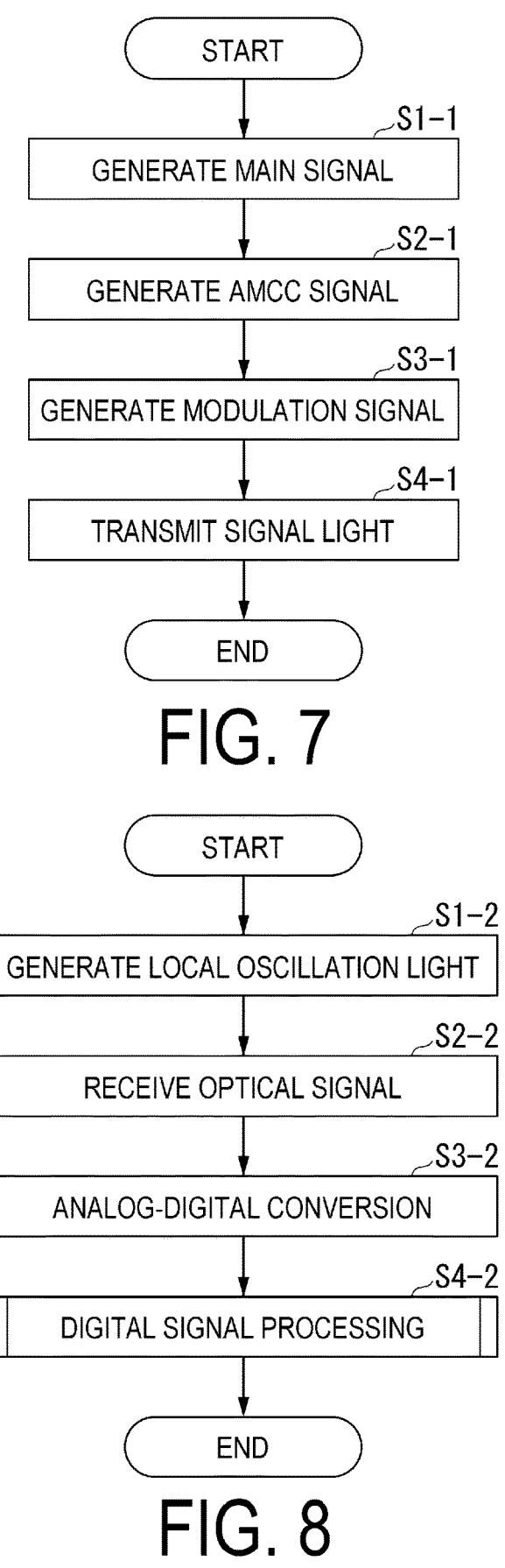

FIG. 7 is a flowchart illustrating an example of the operation of the transmission device 10 included in the communication system 100 according to the present embodiment.

FIG. 8 is a flowchart illustrating an example of the operation of the receiving apparatus 20 included in the communication system 100 according to the present embodiment.

Figure 9:
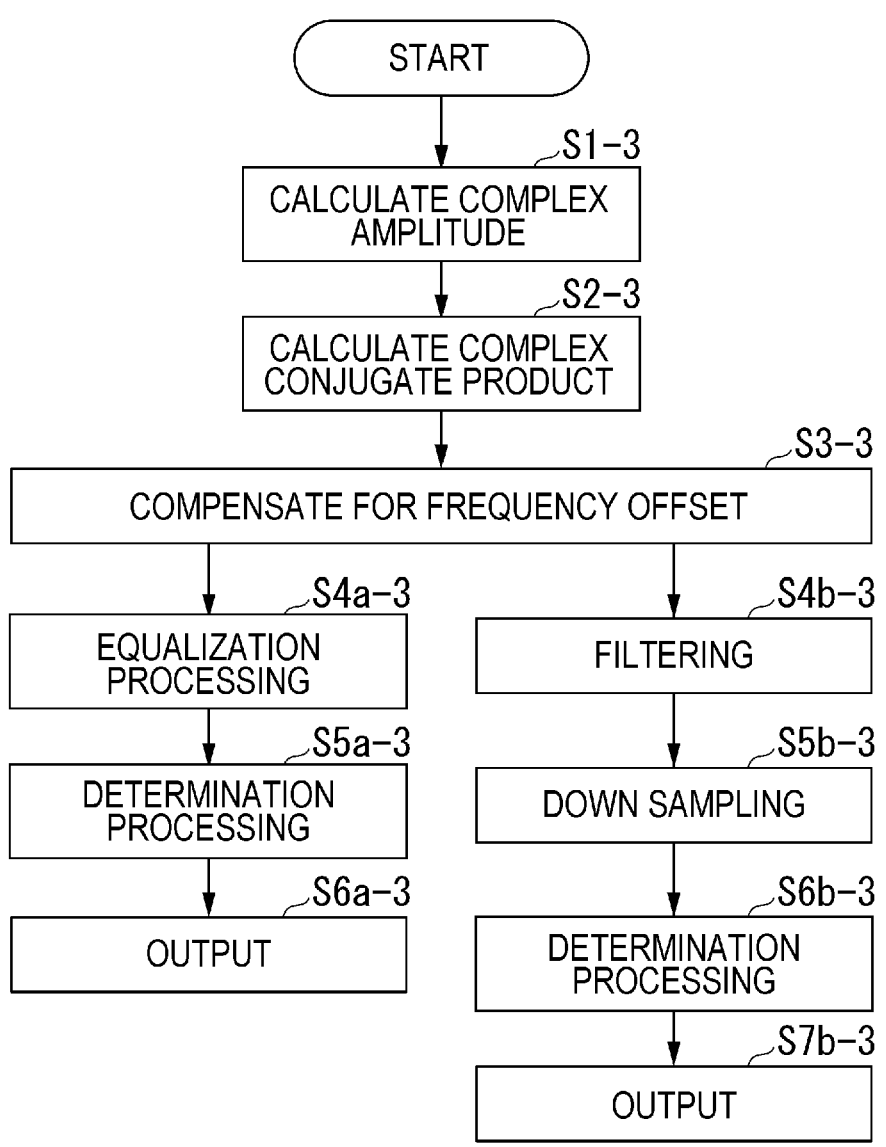

FIG. 9 is a flowchart illustrating an example of the operation of a DSP processing unit 24 of the receiving apparatus 20 according to the present embodiment.

Figure 10:
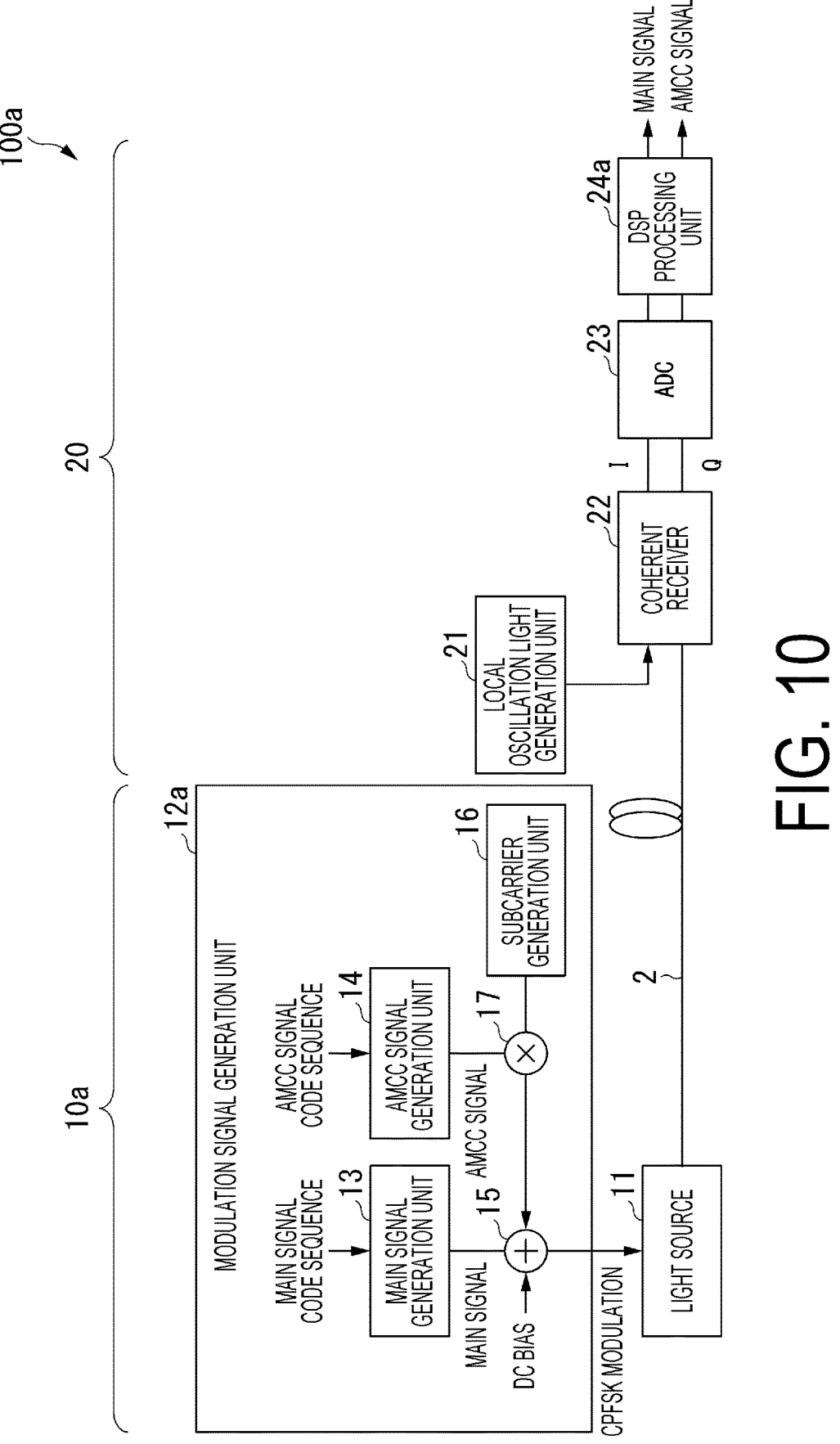

FIG. 10 is a diagram illustrating a system configuration example of a communication system 100a according to a second embodiment of the present invention.

Figure 11:
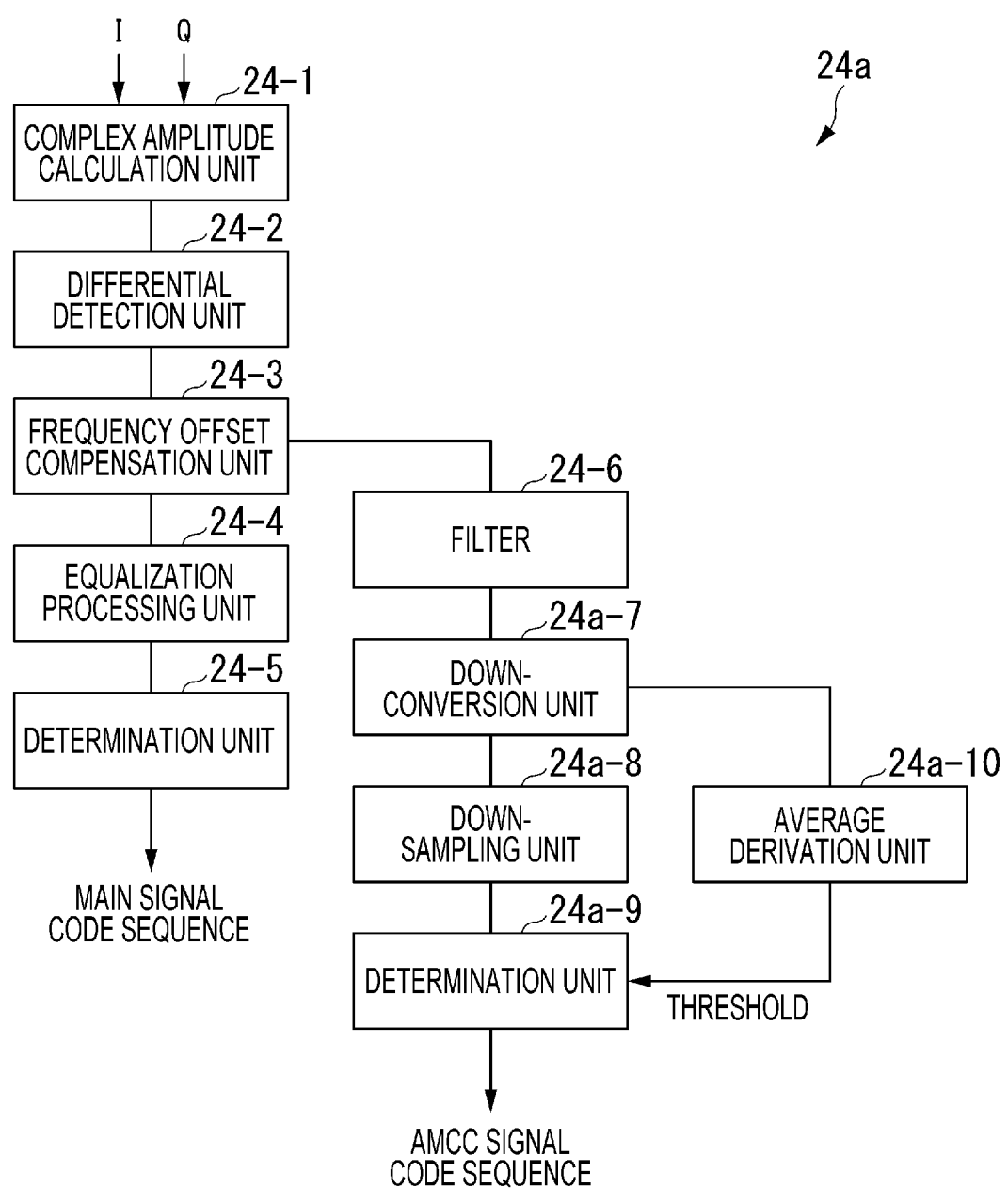

FIG. 11 is a diagram illustrating an example of details of a DSP processing unit 24a of a receiving apparatus 20a according to the present embodiment.

Figure 12:
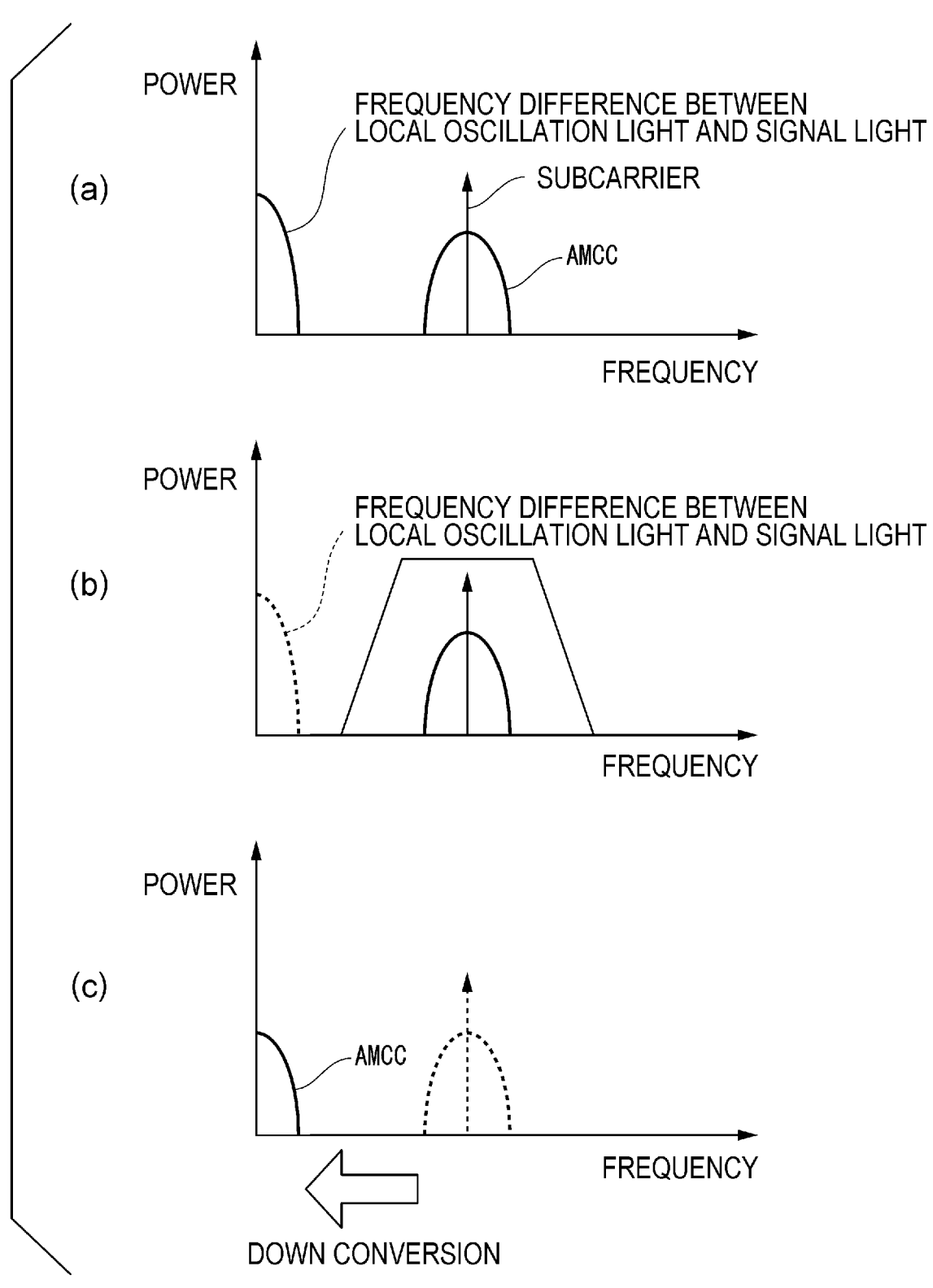

FIG. 12 is a diagram for describing an example of the operation of the receiving apparatus 20a according to the present embodiment.

Figure 13:
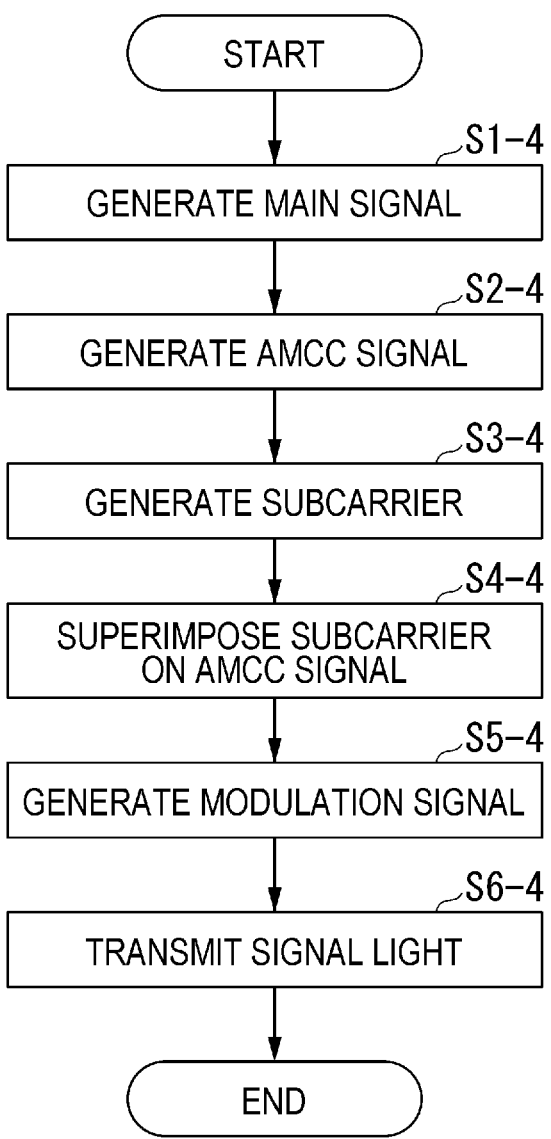

FIG. 13 is a flowchart illustrating an example of the operation of a transmission device 10a included in the communication system 100a according to the present embodiment.

Figure 14:
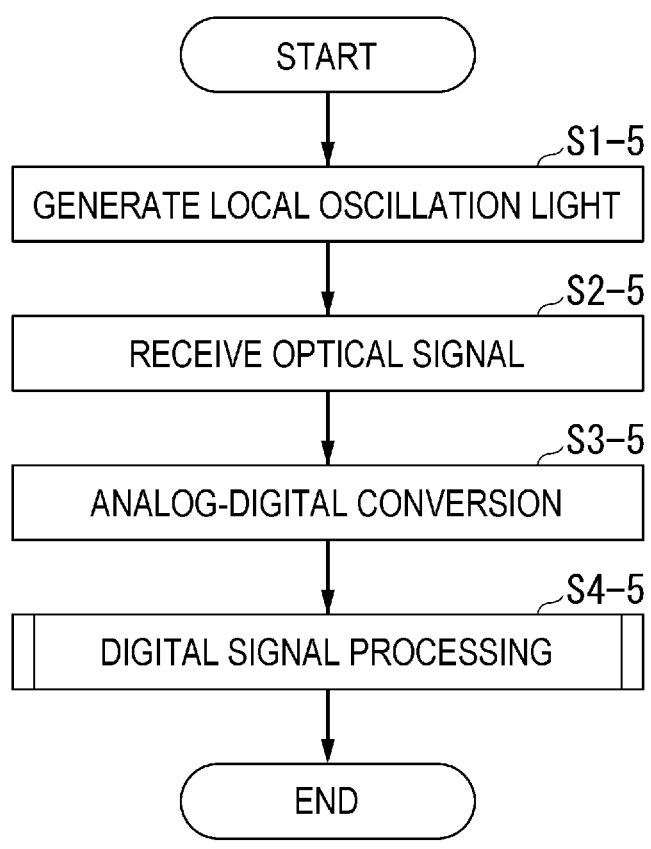

FIG. 14 is a flowchart illustrating an example of the operation of the receiving apparatus 20a included in the communication system 100a according to the present embodiment.

Figure 15:
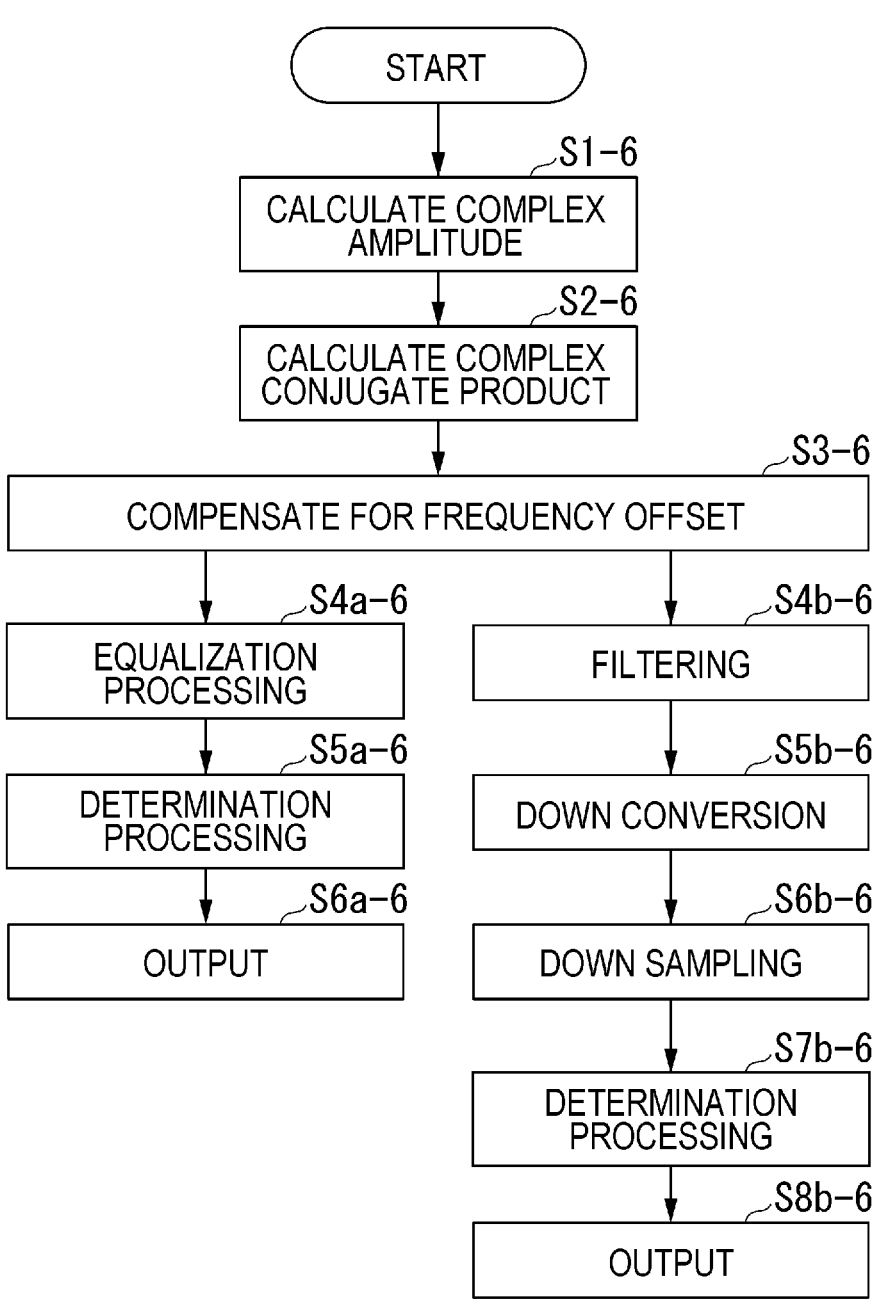

FIG. 15 is a flowchart illustrating an example of the operation of the DSP processing unit 24a of the receiving apparatus 20a according to the present embodiment.

DESCRIPTION OF EMBODIMENTS

First Embodiment

A first embodiment of the present invention will be described in detail with reference to the drawings.

Figure 1:
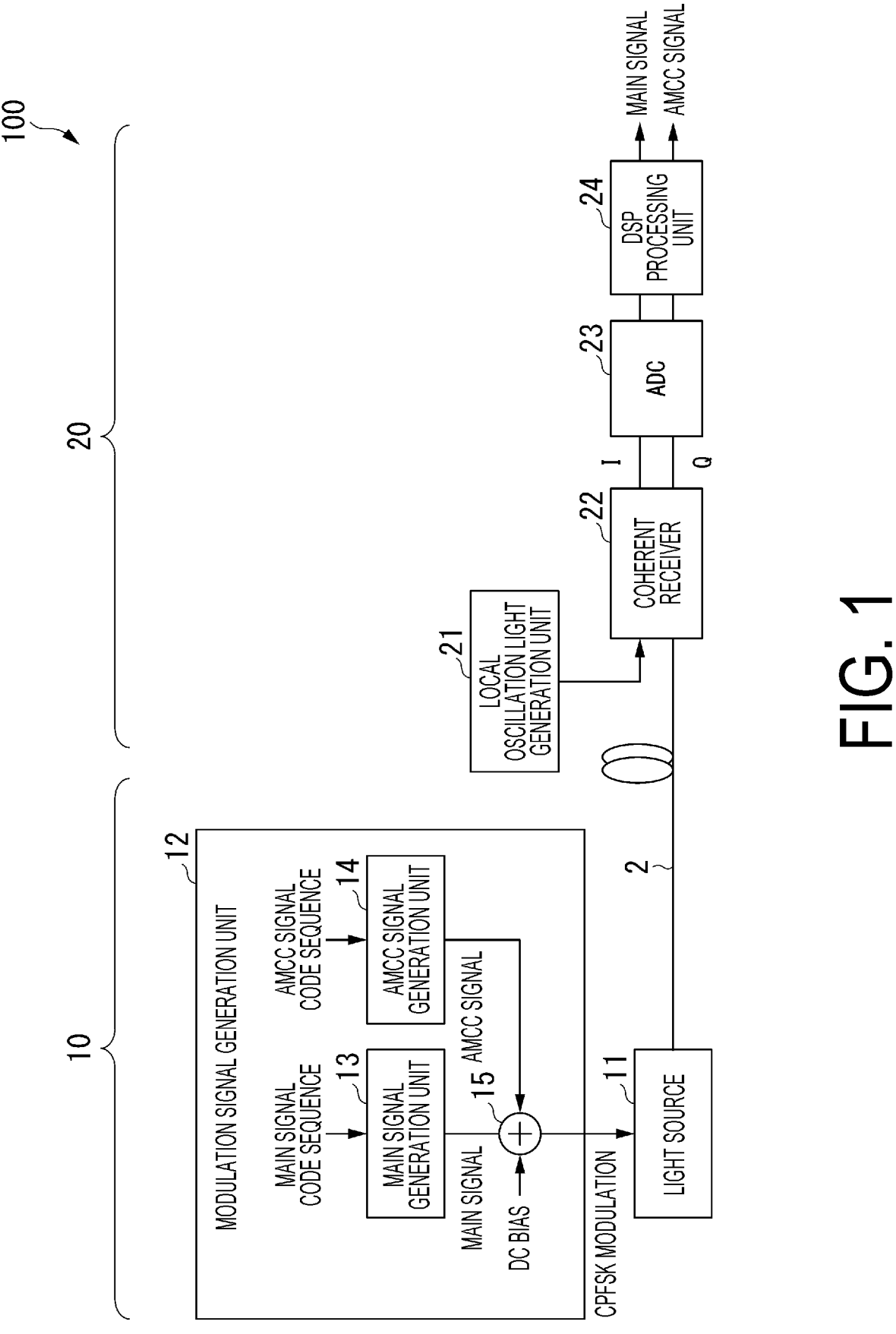
FIG. 1 is a diagram illustrating a system configuration example of a communication system 100 according to a first embodiment of the present invention.

FIG. 1 is a diagram illustrating a system configuration example of a communication system 100 according to the first embodiment of the present invention.

The communication system 100 includes a transmission device 10 and a receiving apparatus 20.

The transmission device 10 directly modulates a laser light with a modulation signal for generating a continuous phase frequency shift keying (CPFSK) signal. The transmission device 10 transmits directly modulated laser light (hereinafter referred to as "signal light"). Signal light transmitted by the transmission device 10 propagates through a transmission path 2. An example of the transmission path 2 is an optical fiber.

The receiving apparatus 20 receives an optical signal including signal light propagated through the transmission path 2 and local oscillation light. The receiving apparatus 20 converts an in-phase component (I component) and a quadrature component (Q component) of the received optical signal into an analog electric signal. The receiving apparatus 20 samples and converts the analog electric signal into a quantized digital signal. The receiving apparatus 20 separates the digital signal into a main signal and an AMCC signal by performing digital signal processing on the digital signal. The receiving apparatus 20 outputs a code sequence on the basis of the main signal and the AMCC signal.

Here, the CPFSK modulation will be described. Note, however, that for the sake of simplicity, a case where a frequency offset $\omega_0$ (frequency difference between center frequency of signal light and local oscillation light) is positive (0 or more) will be described herein as an example.

FIG. 2 is a diagram for describing an example of CPFSK modulation.

In FIG. 2, (a) illustrates an example of an electric field waveform of a transmission signal. In CPFSK, the transmission device modulates a frequency of a signal and transmits a code sequence.

Let A be the amplitude, $\omega$ be the angular frequency of the intermediate frequency, t be the time, and $\varphi$ be the phase. A is temporally constant. The intermediate frequency is a frequency difference between the main signal and the local oscillation light.

An electric field $E_{sig}$ of the reception signal is expressed by the following formula.

$$E_{sig} = A \exp j(\omega t - \varphi)$$

In FIG. 2, (b) illustrates a temporal change of the angular frequency of the intermediate frequency. A change amount $\varphi_{dif}$ of the phase occurring between time t1 and time t2 is expressed by Formula (1).

[Equation 1]

$$\varphi_{dif} = \int_{t1}^{t2} \omega \, dt \tag{1}$$

The phase change amount $\varphi_{dif}$ is equal to an area S between time t1 and time t2 in the time change of the angular frequency of the intermediate frequency in (b). Here, if the time between time t1 and time t2 is taken sufficiently short, the frequency and the phase change amount are proportional to each other. In this case, if the frequency is modulated with a non-return-to-zero (NRZ) signal, the phase change amount can be modulated with NRZ.

In FIG. 2, (c) illustrates a temporal change of the phase change amount. In the CPFSK scheme, frequency modulation is performed on the transmission side, and a code is identified as a phase change amount on the reception side.

FIGS. 3A and 3B are diagrams for describing Example 2 of CPFSK modulation. Note, however, that for the sake of simplicity, a case where the frequency offset $\omega_0$ is 0 will be described herein as an example.

In FIG. 3A, the left diagram illustrates states of a reception symbol sy01a at time t1 and a reception symbol sy02a at time t2 near a symbol corresponding to a code sequence of 1.

In FIG. 3A, the right diagram illustrates a complex amplitude having, as an argument, a phase change amount generated by taking a complex conjugate product between two symbols of the reception symbol sy01a and the reception symbol sy02a.

In FIG. 3B, the left diagram illustrates states of a reception symbol sy01b at time t1 and a reception symbol sy02b at time t2 near a symbol corresponding to a code sequence of 0.

In FIG. 3B, the right diagram illustrates a complex amplitude having, as an argument, a phase change amount generated by taking a complex conjugate product between two symbols of the reception symbol sy01*b* and the reception symbol sy02*b*.

In this manner, a constellation is created by calculating a vector having a phase change amount as a phase, and a transmission code sequence can be identified by performing threshold determination on the created constellation.

Returning to FIG. 1, details of the transmission device 10 and the receiving apparatus 20 included in the communication system 100 will be sequentially described.

(Transmission Device 10)

The transmission device 10 includes a light source 11 and a modulation signal generation unit 12.

An example of the light source 11 is a semiconductor laser. Hereinafter, the case where the light source 11 is a semiconductor laser will be described. The light source 11 directly modulates the drive current by a modulation signal output from the modulation signal generation unit 12.

The modulation signal generation unit 12 generates a modulation signal. The modulation signal generation unit 12 includes a main signal generation unit 13, an AMCC signal generation unit 14, and an addition unit 15.

A main signal code sequence is input to the main signal generation unit 13. The main signal generation unit 13 generates a main signal on the basis of the input main signal code sequence. The main signal generation unit 13 outputs the generated main signal to the addition unit 15.

An AMCC signal code sequence is input to the AMCC signal generation unit 14. The AMCC signal generation unit 14 generates an AMCC signal on the basis of the input AMCC signal code sequence. The AMCC signal generation unit 14 outputs the generated AMCC signal to the addition unit 15.

The addition unit 15 adds the AMCC signal output from the AMCC signal generation unit 14 and a DC bias to the main signal output from the main signal generation unit 13, and outputs the result to the light source 11. While FIG. 1 illustrates that the DC bias is input to the addition unit 15 from the inside of the modulation signal generation unit 12, the DC bias may be input to the addition unit 15 from the outside of the modulation signal generation unit 12.

FIG. 4 is a diagram illustrating an example of a modulation signal generated by the modulation signal generation unit 12 according to the present embodiment. In FIG. 4, the horizontal axis represents time. In FIG. 4, (A) illustrates an example of a time waveform of a main signal. The main signal is a digital signal and takes a discrete value. In FIG. 4, (B) illustrates an example of a time waveform of an AMCC signal. The AMCC signal is a signal (control signal) having a frequency lower than that of the main signal. In FIG. 4, (C) is a signal obtained by adding a DC bias to the modulation signal of the main signal and the modulation signal of the AMCC signal. In (C), the DC bias is added to a signal obtained by adding (2) the modulation signal of the AMCC signal to (1) the modulation signal of the main signal.

When a laser is directly modulated with a modulation signal as shown in (C), intensity and frequency are modulated. At this time, in a case where the DC bias is set to be sufficiently large with respect to (A) and (B), the intensity modulation component becomes small and thus can be ignored. In the present embodiment, it is assumed that the intensity modulation component is negligibly small.

The modulation signal generation unit 12 includes a processor such as a central processing unit (CPU) and a memory. The modulation signal generation unit 12 functions as the main signal generation unit 13, the AMCC signal generation unit 14, and the addition unit 15 when the processor executes a program. Note that all or some of the functions of the modulation signal generation unit 12 may be implemented by using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disc, a ROM, a CD-ROM, or a semiconductor storage device (e.g., solid state drive (SSD)), or a storage device such as a hard disk or a semiconductor storage device built in a computer system. The program may be transmitted via an electric communication line. The description will be continued with reference to FIG. 1.

(Receiving Apparatus 20)

The receiving apparatus 20 includes a local oscillation light generation unit 21, a coherent receiver 22, an analog to digital converter (ADC) 23, and a DSP processing unit 24.

The local oscillation light generation unit 21 generates local oscillation light. Local oscillation light is laser light mounted on the receiving apparatus 20.

The coherent receiver 22 receives local oscillation light output from the local oscillation light generation unit 21 and signal light transmitted from the transmission device 10. The coherent receiver 22 converts the received optical signal into an analog electric signal. Specifically, the coherent receiver 22 performs coherent reception using the received local oscillation light and converts an in-phase component (I component) and a quadrature component (Q component) of the received optical signal into an analog electric signal. The coherent receiver 22 outputs the I component and the Q component (hereinafter referred to as "reception signal") of the optical signal converted into the analog electric signal to the ADC 23.

The ADC 23 samples and discretizes the reception signal output from the coherent receiver 22. The ADC 23 outputs the discretized reception signal to the digital signal processing (DSP) processing unit 24.

The DSP processing unit 24 performs DSP processing on the discretized reception signal output from the ADC 23, and determines a code sequence corresponding to each of the main signal and the AMCC signal on the basis of the reception signal. As a result, the DSP processing unit 24 identifies (decodes) the code sequence corresponding to each of the main signal and the AMCC signal from the received signal. The DSP processing unit 24 outputs the result of determining a code sequence corresponding to each of the main signal and the AMCC signal.

Details of the DSP processing unit 24 will be described.

FIG. 5 is a diagram illustrating an example of the receiving apparatus 20 according to the embodiment. The DSP processing unit 24 includes a complex amplitude calculation unit 24-1, a differential detection unit 24-2, a frequency offset compensation unit 24-3, an equalization processing unit 24-4, a determination unit 24-5, a filter 24-6, a downsampling unit 24-7, a determination unit 24-8, and an average derivation unit 24-9.

Processing of identifying the code sequence corresponding to each of the main signal and the AMCC signal will be described separately for the main signal code sequence and AMCC signal code sequence.

A determination procedure of the main signal code sequence will be described.

The complex amplitude calculation unit 24-1 calculates the complex amplitude on the basis of the discretized reception signal output from the ADC 23. Specifically, results of discretizing the I component and the Q component of the optical signal converted into the analog electric signal are referred to as EI and EQ, respectively. The complex amplitude calculation unit 24-1 calculates a complex amplitude E by Formula (2) on the basis of EI and EQ.

$$E=\sqrt{(EI^2+EQ^2)}\exp j(\tan^{-1}(EQ/EI)) \tag{2}$$

The complex amplitude calculation unit 24-1 outputs the complex amplitude E to the differential detection unit 24-2.

The differential detection unit 24-2 performs operation detection on the basis of the output of the complex amplitude calculation unit 24-1, that is, the complex amplitude E, and calculates a complex amplitude having a phase change amount as a phase. Specifically, the differential detection unit 24-2 calculates a complex conjugate product with the sample after a certain period of time on the basis of the complex amplitude E. The differential detection unit 24-2 outputs a complex amplitude having a phase change amount as a phase (hereinafter referred to as "complex amplitude") to the frequency offset compensation unit 24-3.

The frequency offset compensation unit 24-3 compensates for the output of the differential detection unit 24-2, that is, the frequency offset of the complex amplitude. An example of the frequency offset compensation technology of the CPFSK scheme is described in, for example, "T. Kanai et al., "Wide-Range Frequency Offset Compensation for CPFSK used as TDM-Based Digital Coherent PON's Upstream Signals", ECOC 2019".

FIG. 6 is a diagram illustrating an example of a time waveform of a frequency offset amount. In FIG. 6, the horizontal axis represents time, and the vertical axis represents the frequency offset amount.

As illustrated in FIG. 6, the frequency offset amount includes a (i) component derived from the difference between center frequencies of local oscillation light and signal light, and a (ii) component derived from an AMCC signal. Assuming that the (i) component derived from the difference between center frequencies of local oscillation light and signal light is temporally constant, the frequency offset amount is obtained by superimposing the AMCC signal on a certain DC component.

The frequency offset compensation unit 24-3 calculates an average value of the frequency offset amount to acquire the (i) component derived from the difference between center frequencies of local oscillation light and signal light. The description will be continued with reference to FIG. 5.

In a case where the signal output from the differential detection unit 24-2 includes a phase rotation component due to a frequency offset, threshold determination cannot be performed. Therefore, the frequency offset compensation unit 24-3 detects the "(i) component derived from the difference between center frequencies of local oscillation light and signal light" from the signal output from the differential detection unit 24-2, and performs compensation by giving an appropriate rotation amount on the basis of the detection. The frequency offset compensation unit 24-3 outputs the complex amplitude in which the frequency offset has been compensated for to the equalization processing unit 24-4. The frequency offset compensation unit 24-3 outputs the frequency offset amount to the filter 24-6.

The equalization processing unit 24-4 compensates for waveform distortion received at the transmission path 2 of the output of the frequency offset compensation unit 24-3, that is, the complex amplitude in which the frequency offset has been compensated for. The equalization processing unit 24-4 outputs the result of compensating for waveform distortion of the complex amplitude in which the frequency offset has been compensated for, to the determination unit 24-5.

The determination unit 24-5 determines the code sequence of the main signal by performing threshold determination on the basis of the output of the equalization processing unit 24-4, that is, the result of compensating for waveform distortion of the complex amplitude in which the frequency offset has been compensated for. The determination unit 24-5 outputs the result of determining the code sequence of the main signal.

A determination procedure of the AMCC signal code sequence will be described.

The frequency offset compensation unit 24-3 transmits the estimated frequency offset amount ((i) component derived from difference between the center frequencies of local oscillation light and signal light described above) to the filter 24-6.

The filter 24-6 removes a high-frequency component (main signal component) of the frequency offset amount output from the frequency offset compensation unit 24-3. The filter 24-6 outputs the frequency offset amount from which the high-frequency component has been removed to the down-sampling unit 24-7 and the average derivation unit 24-9.

The down-sampling unit 24-7 down-samples up to the symbol rate of the AMCC signal on the basis of the frequency offset amount from which the high-frequency component has been removed output by the filter 24-6. The down-sampling unit 24-7 outputs the down-sampled frequency offset amount from which the high-frequency component has been removed to the determination unit 24-8.

The average derivation unit 24-9 derives a statistical value such as an average of the frequency offset amount from which the high-frequency component has been removed output from the filter 24-6. Here, a case where an average is applied as an example of the statistical value will be described. The average derivation unit 24-9 outputs an average derivation result to the determination unit 24-8.

On the basis of the output of the down-sampling unit 24-7, that is, the down-sampled frequency offset amount from which the high-frequency component has been removed and the average derivation result derived by the average derivation unit 24-9, the determination unit 24-8 performs threshold determination on the down-sampled frequency offset amount from which the high-frequency component has been removed using the average derivation result as a threshold, thereby determining a code sequence corresponding to the AMCC signal. The determination unit 24-8 outputs the determination result of the AMCC signal.

The DSP processing unit 24 includes a processor such as a CPU and a memory. When the processor executes a program, the DSP processing unit 24 functions as the complex amplitude calculation unit 24-1, the differential detection unit 24-2, the frequency offset compensation unit 24-3, the equalization processing unit 24-4, the determination unit 24-5, the filter 24-6, the down-sampling unit 24-7, the determination unit 24-8, and the average derivation unit 24-9. Note that all or some of the functions of the DSP processing unit 24 may be implemented by using hardware such as an ASIC, a PLD, or an FPGA. The program may be recorded in a computer-readable recording medium. The computer-readable recording medium is, for example, a portable medium such as a flexible disk, a magneto-optical disc, a ROM, a CD-ROM, or a semiconductor storage device (e.g., solid state drive (SSD)), or a storage device such as a hard disk or a semiconductor storage device built in a computer system. The program may be transmitted via an electric communication line.

(Operation of Communication System 100)

FIG. 7 is a flowchart illustrating an example of the operation of the transmission device 10 included in the communication system 100 according to the present embodiment.

(Step S1-1)

In the transmission device 10, a main signal code sequence is input to the main signal generation unit 13. The main signal generation unit 13 generates a main signal on the basis of the input main signal code sequence.

(Step S2-1)

In the transmission device 10, an AMCC signal code sequence is input to the AMCC signal generation unit 14. The AMCC signal generation unit 14 generates an AMCC signal on the basis of the input AMCC signal code sequence.

(Step S3-1)

In the transmission device 10, the main signal generation unit 13 outputs the generated main signal to the addition unit 15. The AMCC signal generation unit 14 outputs the generated AMCC signal to the addition unit 15. The addition unit 15 adds the AMCC signal output from the AMCC signal generation unit 14 and a DC bias to the main signal output from the main signal generation unit 13, and outputs the result to the light source 11.

(Step S4-1)

In the transmission device 10, the light source 11 transmits signal light by directly modulating the drive current by the modulation signal output from the modulation signal generation unit 12.

FIG. 8 is a flowchart illustrating an example of the operation of the receiving apparatus 20 included in the communication system 100 according to the present embodiment.

(Step S1-2)

In the receiving apparatus 20, the local oscillation light generation unit 21 generates local oscillation light.

(Step S2-2)

In the receiving apparatus 20, the coherent receiver 22 receives local oscillation light output by the local oscillation light generation unit 21 and signal light transmitted by the transmission device 10. The coherent receiver 22 converts the received optical signal into an analog electric signal.

(Step S3-2)

In the receiving apparatus 20, the ADC 23 samples and discretizes the reception signal output from the coherent receiver 22. The ADC 23 outputs the discretized reception signal to the DSP processing unit 24.

(Step S4-2)

In the receiving apparatus 20, the DSP processing unit 24 performs DSP processing on the discretized reception signal output from the ADC 23, and determines a code sequence corresponding to each of the main signal and the AMCC signal from the reception signal.

FIG. 9 is a flowchart illustrating an example of the operation of the DSP processing unit 24 of the receiving apparatus 20 according to the present embodiment.

(Step S1-3)

In the receiving apparatus 20, the complex amplitude calculation unit 24-1 calculates the complex amplitude on the basis of the discretized reception signal output from the ADC 23. The complex amplitude calculation unit 24-1 outputs the complex amplitude E to the differential detection unit 24-2.

(Step S2-3)

In the receiving apparatus 20, the differential detection unit 24-2 performs operation detection on the basis of the output of the complex amplitude calculation unit 24-1, and calculates a complex amplitude having a phase change amount as a phase.

(Step S3-3)

In the receiving apparatus 20, the frequency offset compensation unit 24-3 compensates for the output of the differential detection unit 24-2, that is, the frequency offset of the complex amplitude. The frequency offset compensation unit 24-3 outputs the complex amplitude in which the frequency offset has been compensated for, to the equalization processing unit 24-4. The frequency offset compensation unit 24-3 outputs the frequency offset amount to the filter 24-6.

(Step S4a-3)

In the receiving apparatus 20, the equalization processing unit 24-4 compensates for waveform distortion received in the transmission path 2 of the complex amplitude, in which the frequency offset has been compensated for, output by the frequency offset compensation unit 24-3. The equalization processing unit 24-4 outputs the result of compensating for the waveform distortion of the complex amplitude in which the frequency offset has been compensated for, to the determination unit 24-5.

(Step S5a-3)

The determination unit 24-5 determines the code sequence of the main signal by performing threshold determination on the result of compensating for waveform distortion of the complex amplitude in which the frequency offset has been compensated for output by the equalization processing unit 24-4.

(Step S6a-3)

In the receiving apparatus 20, the determination unit 24-5 outputs the result of determining the code sequence of the main signal.

(Step S4b-3)

In the receiving apparatus 20, the filter 24-6 removes a high-frequency component of the frequency offset amount on the basis of the frequency offset amount output from the frequency offset compensation unit 24-3. The filter 24-6 outputs the frequency offset amount from which the high-frequency component has been removed to the down-sampling unit 24-7 and the average derivation unit 24-9.

(Step S5b-3)

In the receiving apparatus 20, the down-sampling unit 24-7 extracts a symbol by performing down sampling up to the symbol rate of the AMCC signal on the basis of the frequency offset amount from which the high-frequency component has been removed output from the filter 24-6.

(Step S6b-3)

In the receiving apparatus 20, the average derivation unit 24-9 derives an average of the frequency offset amount from which the high-frequency component has been removed output from the filter 24-6. The average derivation unit 24-9 outputs an average derivation result to the determination unit 24-8.

On the basis of the symbol output by the down-sampling unit 24-7 and the average derived by the average derivation unit 24-9, the determination unit 24-8 performs threshold determination on the symbol extracted by the down-sampling unit 24-7 using the average derivation result as a threshold, thereby determining a code sequence corresponding to the AMCC signal.

(Step S7b-3)

In the receiving apparatus 20, the determination unit 24-8 outputs the result of determining the code sequence corresponding to the AMCC signal.

In the first embodiment described above, a case where the receiving apparatus receives a CPFSK signal light generated by direct modulation with a modulation signal in which an AMCC signal is superimposed on a main signal has been described. However, the present invention is not limited to this example. A CPFSK signal light directly modulated by a modulation signal in which, instead of the AMCC signal, a control signal having a frequency lower than that of the main signal is superimposed on the main signal can be applied.

In the receiving apparatus 20 configured as described above, since the DSP processing unit 24 analyzes the frequency offset amount and performs threshold determination on the basis of the analysis result to determine the code sequence of the AMCC signal, the DSP processing unit 24 can separate the main signal and the AMCC signal from each other by using the electric signal.

In a case where separation of the main signal and the AMCC signal is performed by the optical signal, reception light intensity in the coherent receiver decreases, and noise characteristics deteriorate. In addition, in a case where separation of the main signal and the AMCC signal is performed by the optical signal, a device for AMCC reception is required. In the receiving apparatus 20 configured as described above, since the separation of the main signal and the AMCC signal is performed by the DSP processing unit 24 using the electric signal, noise characteristics can be improved without using a device for AMCC reception.

In the receiving apparatus 20 configured as described above, since the separation of the main signal and the AMCC signal is performed by the DSP processing unit 24 using the electric signal, the noise characteristics can be improved.

Second Embodiment

A second embodiment of the present invention will be described in detail with reference to the drawings.

FIG. 10 is a diagram illustrating a system configuration example of a communication system 100a according to the second embodiment of the present invention.

The communication system 100a includes a transmission device 10a and a receiving apparatus 20a.

In the first embodiment, the AMCC signal is identified on the basis of a frequency offset amount output by the frequency offset compensation unit 24-3 by using the fact that the AMCC signal is proportional to the frequency offset amount.

When the difference between the frequency of the light source 11 and the frequency of the local oscillation light varies, a component derived from the difference between the central frequencies of the local oscillation light and the signal light also changes. When the frequency offset variation derived from the difference between the center frequencies of the local oscillation light and the signal light and the frequency offset variation based on the AMCC signal are in the same frequency region, the AMCC signal cannot be separated. Therefore, the receiving apparatus 20a according to the second embodiment separates the AMCC signal when the difference between the frequency of the light source 11 and the frequency of the local oscillation light varies.

(Transmission Device 10a)

The transmission device 10a includes a light source 11 and a modulation signal generation unit 12a.

The modulation signal generation unit 12a generates a modulation signal. The modulation signal generation unit 12a includes a main signal generation unit 13, an AMCC signal generation unit 14, an addition unit 15, a subcarrier generation unit 16, and a multiplication unit 17.

The subcarrier generation unit 16 generates a subcarrier.

The multiplication unit 17 superimposes the subcarrier generated by the subcarrier generation unit 16 on an AMCC signal generated by the AMCC signal generation unit 14.

The addition unit 15 adds the main signal output from the main signal generation unit 13, the signal obtained by superimposing the subcarrier on the AMCC signal output from the multiplication unit 17, and a DC bias, and outputs the result to the light source 11. While FIG. 10 illustrates that the DC bias is input to the addition unit 15 from the inside of the modulation signal generation unit 12a, the DC bias may be input to the addition unit 15 from the outside of the modulation signal generation unit 12a.

The modulation signal generation unit 12a includes a processor such as a CPU and a memory. The modulation signal generation unit 12a functions as the main signal generation unit 13, the AMCC signal generation unit 14, the addition unit 15, the subcarrier generation unit 16, and the multiplication unit 17 when the processor executes a program. Note that all or some of the functions of the modulation signal generation unit 12a may be implemented by using hardware such as an ASIC, a PLD, or an FPGA. The program may be recorded in a computer-readable recording medium. The computer-readable recording medium is, for example, a portable medium such as a flexible disk, a magneto-optical disc, a ROM, a CD-ROM, or a semiconductor storage device (e.g., solid state drive (SSD)), or a storage device such as a hard disk or a semiconductor storage device built in a computer system. The program may be transmitted via an electric communication line.

(Receiving Apparatus 20a)

The receiving apparatus 20a includes a local oscillation light generation unit 21, a coherent receiver 22, an ADC 23, and a DSP processing unit 24a.

The DSP processing unit 24a performs DSP processing on the discretized reception signal output from the ADC 23, and determines a code sequence corresponding to each of the main signal and the AMCC signal from the reception signal. The DSP processing unit 24a outputs the result of determining a code sequence corresponding to each of the main signal and the AMCC signal.

Details of the DSP processing unit 24a will be described.

FIG. 11 is a diagram illustrating an example of details of the DSP processing unit 24a of the receiving apparatus 20a according to the present embodiment. The DSP processing unit 24a includes a complex amplitude calculation unit 24-1, a differential detection unit 24-2, a frequency offset compensation unit 24-3, an equalization processing unit 24-4, a determination unit 24-5, a filter 24-6, a down-conversion unit 24a-7, a down-sampling unit 24a-8, a determination unit 24a-9, and an average derivation unit 24a-10.

Since the first embodiment can be applied to the determination procedure of the main signal code sequence, the description thereof is omitted here.

A determination procedure of the AMCC signal code sequence will be described.

The filter 24-6 cuts out (extracts) a signal of the frequency band of the AMCC signal by filtering (removing) a signal other than the signal of the frequency band of the AMCC signal on the basis of the frequency offset amount output from the frequency offset compensation unit 24-3. By cutting out the signal of the frequency band of the AMCC signal, the component derived from the frequency difference between local oscillation light and signal light is removed. The filter 24-6 outputs the extracted signal of the frequency band of the AMCC signal to the down-conversion unit 24a-7.

The down-conversion unit 24a-7 acquires the signal of the frequency band of the AMCC signal output from the filter 24-6. The down-conversion unit 24a-7 down-converts the acquired signal of the frequency band of the AMCC signal to baseband to remove the subcarrier. The down-conversion unit 24a-7 outputs the down-converted signal of the frequency band of the AMCC, to the average derivation unit 24-9.

The down-sampling unit 24a-8 extracts a symbol by down-sampling the down-converted signal of the frequency band of the AMCC signal to the symbol rate of the AMCC signal. The down-sampling unit 24a-8 outputs the extracted symbol to the determination unit 24a-9.

The average derivation unit 24a-10 derives a statistical value such as an average of the down-converted signals of the frequency band of the AMCC output by the down-conversion unit 24a-7. Here, a case where an average is applied as an example of the statistical value will be described. The average derivation unit 24a-10 outputs an average derivation result to the determination unit 24a-9.

On the basis of the output of the down-sampling unit 24a-8, that is, the symbol, and the average derivation result derived by the average derivation unit 24a-10, the determination unit 24a-9 performs threshold determination on the symbol using the average derivation result as a threshold, thereby determining the AMCC signal. The determination unit 24a-9 outputs the determination result of the AMCC signal.

The DSP processing unit 24a includes a processor such as a CPU and a memory. When the processor executes a program, the DSP processing unit 24a functions as the complex amplitude calculation unit 24-1, the differential detection unit 24-2, the frequency offset compensation unit 24-3, the equalization processing unit 24-4, the determination unit 24-5, the filter 24-6, the down-conversion unit 24a-7, the down-sampling unit 24a-8, the determination unit 24a-9, and the average derivation unit 24a-10. Note that all or some of the functions of the DSP processing unit 24a may be implemented by using hardware such as an ASIC, a PLD, or an FPGA. The program may be recorded in a computer-readable recording medium. The computer-readable recording medium is, for example, a portable medium such as a flexible disk, a magneto-optical disc, a ROM, a CD-ROM, or a semiconductor storage device (e.g., solid state drive (SSD)), or a storage device such as a hard disk or a semiconductor storage device built in a computer system. The program may be transmitted via an electric communication line.

FIG. 12 is a diagram for describing an example of the operation of the receiving apparatus 20a according to the present embodiment. In FIG. 12, the horizontal axis represents frequency, and the vertical axis represents power.

In FIG. 12, (a) illustrates an example of a frequency spectrum of the discretized reception signal input to the DSP processing unit 24a. In FIG. 12, (b) illustrates an example of the signal of the frequency band of the AMCC signal cut out by the filter 24-6. In FIG. 12, (c) illustrates an example of the signal of the frequency band of the AMCC signal down-converted by the down-conversion unit 24a-7.

(Operation of Communication System 100a)

FIG. 13 is a flowchart illustrating an example of the operation of the transmission device 10a included in the communication system 100a according to the present embodiment.

(Step S1-4)

In the transmission device 10a, a main signal code sequence is input to the main signal generation unit 13. The main signal generation unit 13 generates a main signal on the basis of the input main signal code sequence.

(Step S2-4)

In the transmission device 10a, an AMCC signal code sequence is input to the AMCC signal generation unit 14. The AMCC signal generation unit 14 generates an AMCC signal on the basis of the input AMCC signal code sequence.

(Step S3-4)

In the transmission device 10a, the subcarrier generation unit 16 generates a subcarrier.

(Step S4-4)

In the transmission device 10a, the multiplication unit 17 superimposes the subcarrier generated by the subcarrier generation unit 16 on the AMCC signal generated by the AMCC signal generation unit 14.

(Step S5-4)

In the transmission device 10, the main signal generation unit 13 outputs the generated main signal to the addition unit 15. The multiplication unit 17 outputs a signal obtained by superimposing the subcarrier on the AMCC signal to the addition unit 15. The addition unit 15 adds the main signal output from the main signal generation unit 13, the signal obtained by superimposing the subcarrier on the AMCC signal output from the multiplication unit 17, and a DC bias, and outputs the result to the light source 11.

(Step S6-4)

In the transmission device 10a, the light source 11 transmits CPFSK signal light by directly modulating the drive current by the modulation signal output from the modulation signal generation unit 12a.

FIG. 14 is a flowchart illustrating an example of the operation of the receiving apparatus 20a included in the communication system 100a according to the present embodiment.

(Step S1-5)

In the receiving apparatus 20a, the local oscillation light generation unit 21 generates local oscillation light.

(Step S2-5)

In the receiving apparatus 20a, the coherent receiver 22 receives local oscillation light output by the local oscillation light generation unit 21 and signal light transmitted by the transmission device 10a. The coherent receiver 22 converts the received optical signal into an analog electric signal.

(Step S3-5)

In the receiving apparatus 20a, the ADC 23 samples and discretizes the reception signal output from the coherent receiver 22. The ADC 23 outputs the discretized reception signal to the DSP processing unit 24a.

(Step S4-5)

In the receiving apparatus 20a, the DSP processing unit 24a performs DSP processing on the discretized reception signal output from the ADC 23, and decodes a code sequence corresponding to each of the main signal and the AMCC signal from the reception signal.

FIG. 15 is a flowchart illustrating an example of the operation of the DSP processing unit 24a of the receiving apparatus 20a according to the present embodiment.

Since FIG. 9 can be applied to steps S1-6 to S6a-6, description thereof is omitted here.

(Step S4b-6)

In the receiving apparatus 20*a*, the filter 24-6 cuts out (extracts) a signal of the frequency band of the AMCC signal by filtering (removing) a signal other than the signal of the frequency band of the AMCC signal on the basis of the frequency offset amount output from the frequency offset compensation unit 24-3. The filter 24-6 outputs the acquired signal of the frequency band of the AMCC signal to the down-conversion unit 24*a*-7.

(Step S5b-6)

In the receiving apparatus 20*a*, the down-conversion unit 24*a*-7 acquires the signal of the frequency band of the AMCC signal output from the filter 24-6, and down-converts the acquired signal of the frequency band of the AMCC signal to baseband. The down-conversion unit 24*a*-7 outputs the down-converted signal of the frequency band of the AMCC to the down-sampling unit 24*a*-8 and the average derivation unit 24-9.

(Step S6b-6)

In the receiving apparatus 20*a*, the down-sampling unit 24*a*-8 extracts a symbol by down-sampling the down-converted frequency band of the AMCC signal to the symbol rate of the AMCC signal.

(Step S7b-6)

In the receiving apparatus 20*a*, the average derivation unit 24*a*-10 derives the average of the down-converted signals of the frequency band of the AMCC output by the down-conversion unit 24*a*-7. The average derivation unit 24*a*-10 outputs an average derivation result to the determination unit 24*a*-9. On the basis of the output of the down-sampling unit 24*a*-8, that is, the symbol, and the average derivation result derived by the average derivation unit 24*a*-10, the determination unit 24*a*-9 performs threshold determination on the symbol using the average derivation result as a threshold, thereby determining a code sequence corresponding to the AMCC signal.

(Step S7b-6)

In the receiving apparatus 20*a*, the determination unit 24*a*-9 outputs the determination result of the AMCC signal.

In the second embodiment described above, a case where the receiving apparatus receives a CPFSK signal light directly modulated by a modulation signal in which an AMCC signal on which the subcarrier is superimposed is superimposed on the main signal has been described. However, the present invention is not limited to this example. A CPFSK signal light directly modulated by a modulation signal in which, instead of the AMCC signal, a signal on which the subcarrier is superimposed and having a frequency lower than that of the main signal is superimposed on the main signal can be applied.

In the receiving apparatus 20*a* configured as described above, since the DSP processing unit 24*a* analyzes the frequency offset amount and performs threshold determination on the basis of the analysis result to determine the code sequence of the AMCC signal, the DSP processing unit 24*a* can separate the main signal and the AMCC signal from each other by using the electric signal.

In the receiving apparatus 20 configured as described above, since the separation of the main signal and the AMCC signal is performed by the DSP processing unit 24*a* using the electric signal, the noise characteristics can be improved.

In the first and second embodiments described above, the coherent receiver 22 is an example of a reception unit, the frequency offset compensation unit 24-3 is an example of a frequency offset amount acquisition unit, the average derivation units 24-9 and 24*a*-10 are examples of a derivation unit, and the filter 24-6 is an example of a frequency component removal unit.

While the embodiments of the present invention have been described in detail with reference to the drawings, specific configurations are not limited to these embodiments, and include designs and the like without departing from the spirit of the present invention.

INDUSTRIAL APPLICABILITY

The present invention is applicable to a communication system.

REFERENCE SIGNS LIST

2 Transmission path
10, 10*a* Transmission device
11 Light source
12, 12*a* Modulation signal generation unit
13 Main signal generation unit
14 AMCC signal generation unit
15 Addition unit
16 Subcarrier generation unit
17 Multiplication unit
20, 20*a* Receiving apparatus
21 Local oscillation light generation unit
22 Coherent receiver
23 ADC
24, 24*a* DSP processing unit
24-1 Complex amplitude calculation unit
24-2 Differential detection unit
24-3 Frequency offset compensation unit
24-4 Equalization processing unit
24-5 Determination unit
24-6 Filter
24-7 Down-sampling unit
24-8 Determination unit
24-9 Average derivation unit
24*a*-7 Down-conversion unit
24*a*-8 Down-sampling unit
24*a*-9 Determination unit
24*a*-10 Average derivation unit
100, 100*a* Communication system

The invention claimed is:

1. A receiving apparatus comprising:
a receiver that receives signal light frequency-modulated by a signal obtained by adding a main signal and a control signal having a lower frequency than the main signal, and converts the signal light into an analog electric signal; and
a processor that acquires a code sequence corresponding to the control signal on the basis of the analog electric signal,
wherein the processor is configured to execute instructions to
acquire a frequency offset amount of the signal light acquired on the basis of the analog electric signal, and
remove a high-frequency component of the frequency offset amount,
extract a symbol corresponding to the control signal, by down-sampling on the basis of the frequency offset amount from which the high-frequency component has been removed;
derive a statistical value of the frequency offset amount from which the high-frequency component has been removed; and determine the code sequence corresponding to the control signal on the basis of the extracted symbol and the derived statistical value.

2. The receiving apparatus according to claim 1, wherein the processor is configured to execute instructions to extract the symbol corresponding to the control signal by down-sampling, to a symbol rate of the control signal, on the basis of the frequency offset amount from which the high-frequency component has been removed.

3. A receiving apparatus comprising:

a receiver that receives signal light frequency-modulated by a signal obtained by adding a main signal and a signal obtained by superimposing a subcarrier on a control signal having a lower frequency than the main signal, and converts the signal light into an analog electric signal; and a processor that acquires a code sequence corresponding to the control signal on the basis of the analog electric signal, wherein the processor is configured to execute instructions to acquire a frequency offset amount of the signal light acquired on the basis of the analog electric signal, remove a signal other than a signal of a frequency band of the control signal from the frequency offset amount, and down-convert the signal of the frequency band of the control signal that is extracted by removal, derive a statistical value of the signal of the frequency band of the control signal that is down-converted to the baseband, and determine the code sequence corresponding to the control signal on the basis of the derived statistical value and the signal of the frequency band of the control signal that is down-converted to the baseband.

4. The receiving apparatus according to claim 3, wherein the processor is further configured to execute instructions to extract a symbol corresponding to the control signal by down-sampling, to a symbol rate of the control signal, the frequency offset amount of a frequency band of the control signal down-converted to the baseband, and the processor is configured to execute instructions to determine the code sequence corresponding to the control signal on the basis of the derived statistical value and the extracted symbol corresponding to the control signal by the down-sampling.

5. The receiving apparatus according to claim 3, wherein the processor is configured to derive the statistical value of the signal of the frequency band of the control signal in which a subcarrier is removed by down-converting, and determine the code sequence corresponding to the control signal on the basis of the derived statistical value and the signal of the frequency band of the control signal in which the subcarrier is removed.

6. A receiving method executed by a receiving apparatus, the receiving method comprising:

receiving signal light frequency-modulated by a signal obtained by adding a main signal and a control signal having a lower frequency than the main signal, and converting the signal light into an analog electric signal;

acquiring a frequency offset amount of the signal light acquired on the basis of the analog electric signal;

removing a high-frequency component of the frequency offset amount, extracting a symbol corresponding to the control signal, by down-sampling on the basis of the frequency offset amount from which the high-frequency component has been removed;

deriving a statistical value of the frequency offset amount from which the high-frequency component has been removed; and determining a code sequence corresponding to the control signal on the basis of the extracted symbol and the derived statistical value.

* * * * *